No. 774,146.

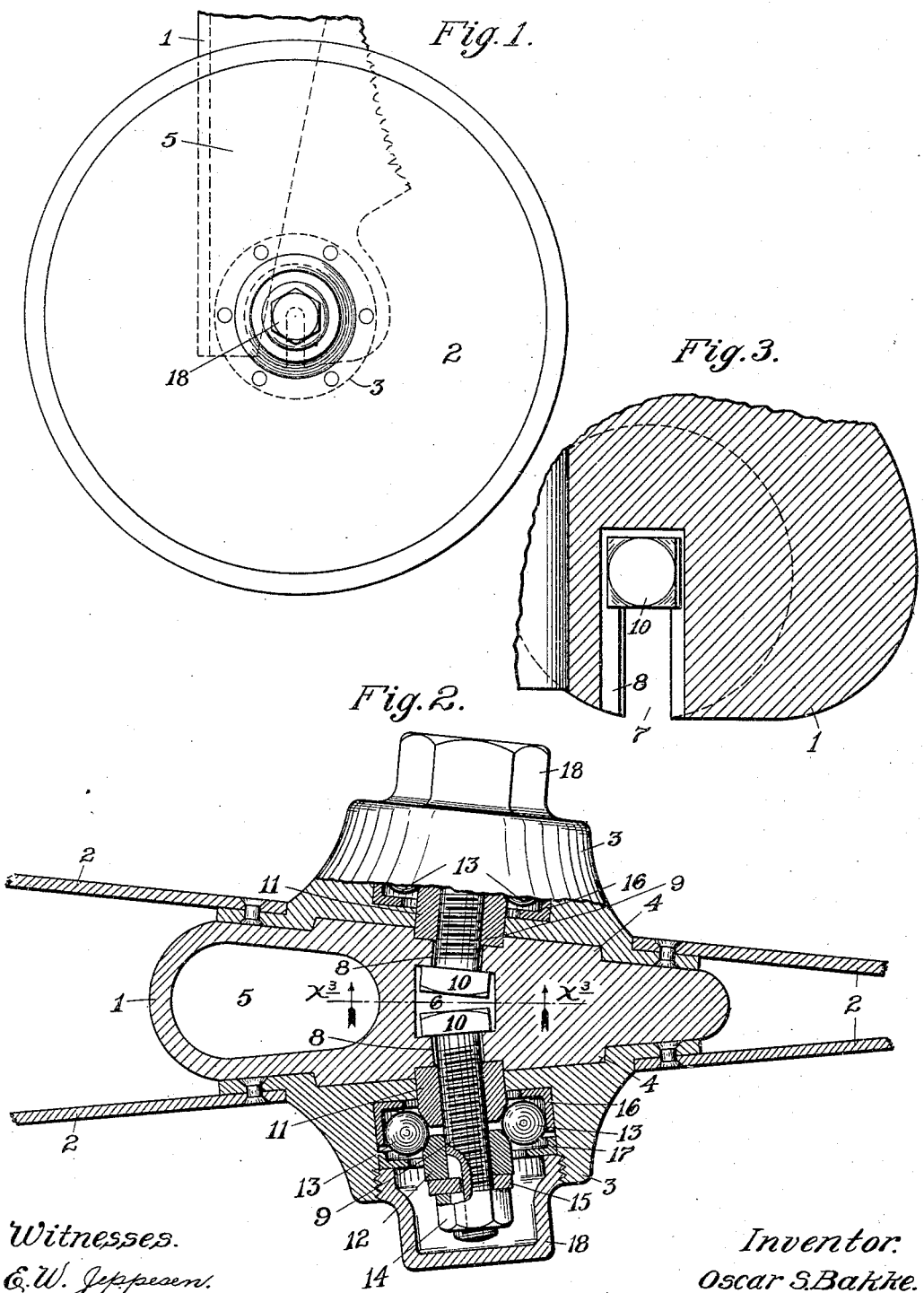

Patented November 8, 1904.

UNITED STATES PATENT OFFICE.

OSCAR S. BAKKE, OF MINNEAPOLIS, MINNESOTA.

BALL-BEARING FOR DISK DRILLS.

SPECIFICATION forming part of Letters Patent No. 774,146, dated November 8, 1904.

Application filed March 25, 1904. Serial No. 199,894. (No model.)

*To all whom it may concern:*

Be it known that I, OSCAR S. BAKKE, a citizen of the United States, residing at Minneapolis, in the county of Hennepin and State of Minnesota, have invented certain new and useful Improvements in Ball-Bearings for Disk Drills; and I do hereby declare the following to be a full, clear, and exact description of the invention, such as will enable others skilled in the art to which it appertains to make and use the same.

The invention has for its object to provide an improved ball-bearing journal for disk drills; and to this end it consists of the novel devices and combinations of devices hereinafter described, and defined in the claims.

The invention is illustrated in the accompanying drawings, wherein like characters indicate like parts throughout the several views.

Figure 1 is a view in side elevation, with some parts broken away, showing the disks and boot of a disk drill, said parts being connected in accordance with my invention. Fig. 2 is an enlarged sectional view taken approximately on a horizontal line passing through the center of Fig. 1, and Fig. 3 is a detail in section on the line $x^3$ $x^3$ of Fig. 2.

The numeral 1 indicates the seed-boot, and the numeral 2 the disks, which disks are secured to annular hubs 3 by rivets or in any other suitable way. At the sides of its lower extremity the seed-boot 1 is formed with laterally-projecting bosses 4, which fit in recesses formed in the inner faces of the hubs 3. The hubs 3 when fitted onto the bosses 4 bear against the sides of the boot with their axes intersecting at an angle, so that the disks diverge rearward, as is usual in disk-drills. Forward of its seed-passage 5 the boot 1 is formed with a vertical recess 6. The walls on the opposite sides of the recess 6 are slotted at 7, so as to leave vertical clamping-ribs 8. The recess 6 and slots 7 are opened at their lower extremities.

Threaded trunnions 9 project outward through the slot 7, with their heads 10 located within the recess 6. The said bolts of course extend at an angle to each other and at right angles to the bearing-faces of the corresponding hubs 3. Hardened bearing-nuts 11 and 12 work with screw-threaded engagement on the trunnions 9. The nuts 11 are tightened, so as to clamp the heads 10 of the bolts firmly against the interposed ribs 8 of the seed-boot, thereby rigidly securing the trunnions 9. Both of the nuts 11 and 12 are beveled, so that they afford cone-bearings for the bearing-balls 13. Nuts 14 work on the outer end of the trunnions 9, and washers 15 are preferably interposed between the said nuts 14 and the coöperating nuts or bearings 12. The nuts 14 when tightened lock the bearings 12 against rotation.

The hubs 3 are formed with recesses that open at their outer faces and in which are seated coöperating pairs of hardened ball-runways 16 and 17. The said ball-runways are of course annular in contour, and in cross-section they are rectangular. The inner members 16 are wider than the outer members 17, so that the balls 13 will engage the peripheral flanges of the former, but not of the latter. Cap-nuts 18 are screwed into the recesses of the hubs 3 and press the annular ball-runways 17.

With the construction described it is evident that the trunnions 9 when loosened up may be removed from working position by dropping them laterally downward through the slots 7, and it is of course evident that they may be placed in working positions by reverse movements. It is also evident that the annular ball-runways and the bearing-cones if worn or broken, may be readily replaced. It is further obvious that the ball-bearing devices will mount the disks to run under a minimum of friction and at the same time that such ball-bearing devices are relieved from intense strains by the engagement of the bosses 4 with the correspondingly-formed recesses of the hubs 3. Furthermore, the device is of simple construction and of small cost.

What I claim, and desire to secure by Letters Patent of the United States, is as follows:

1. The combination with a seed-boot, of threaded trunnions having heads seated within a recess of said boot and projecting therefrom at an angle to each other, of bearing-cones on said trunnions, one in each pair serving as a nut to clamp the coöperating trunnion-head to said boot, disks, having hubs provided with ball-runways, bearing-balls coöperating with said ball-runways and cone-bearings, and means for holding the said disks in operative positions on the said trunnions, substantially as described.

2. The combination with a seed-boot having the recess 6, the slot 7 and vertical ribs 8, of a trunnion 9 having a head seated in said recess 6, said trunnion projecting through said slot 7, a cone-bearing 11 screw-threaded on said trunnion and coöperating with said head 10 to clamp said ribs 8, an outer cone-bearing 12 on said trunnion, a nut on the outer end of said trunnion for locking said bearing 12, a disk having a hub 3 recessed, and provided in said recess with the ball-runways 16 and 17, the bearing-balls 13 coöperating with said cone-bearings 11 and 12 and runways 16 and 17, and the cap-nut 18 screwed into the recess of said hub 3 and pressing against said ball-runways 17, substantially as described.

3. The combination with a seed-boot 1 having a laterally-projecting boss 4, a vertical recess 6, vertical slot 7, and vertical ribs 8, of a disk having a hub 3 bearing against the face of said boot 1 and recessed to receive said boss 4, a threaded trunnion 9 projecting through said slot 7 and having a head 10 within said recess 6, the bearing-cones 11 and 12 on said trunnion 9, the former coöperating with said head 10 to clamp said ribs 8, bearing-balls coöperating with said cones and with ball-runways carried by said hub 3, and means for holding said hub in working position, substantially as described.

In testimony whereof I affix my signature in presence of two witnesses.

OSCAR S. BAKKE.

Witnesses:
JOHN J. MARTIN,
J. A. DAHL.